June 29, 1948.　　　　G. ROYSTON　　　　2,444,406
APPARATUS FOR DRYING AND CONDITIONING SULFATE
OF AMMONIA AND OTHER GRANULAR AND
CRYSTALLINE PRODUCTS
Filed July 6, 1945　　　　　　　　　　　　2 Sheets-Sheet 1
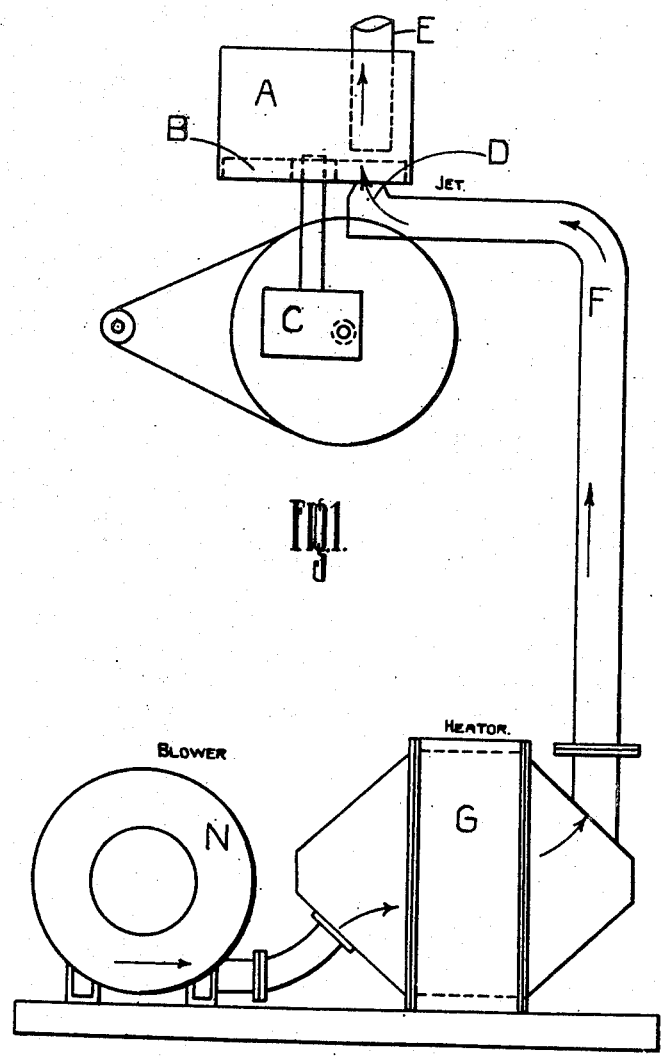
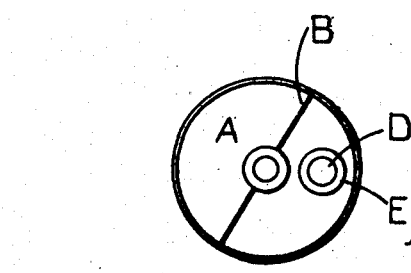
George Royston *Inventor*
By
Harold Edwin Potts *Attorney*

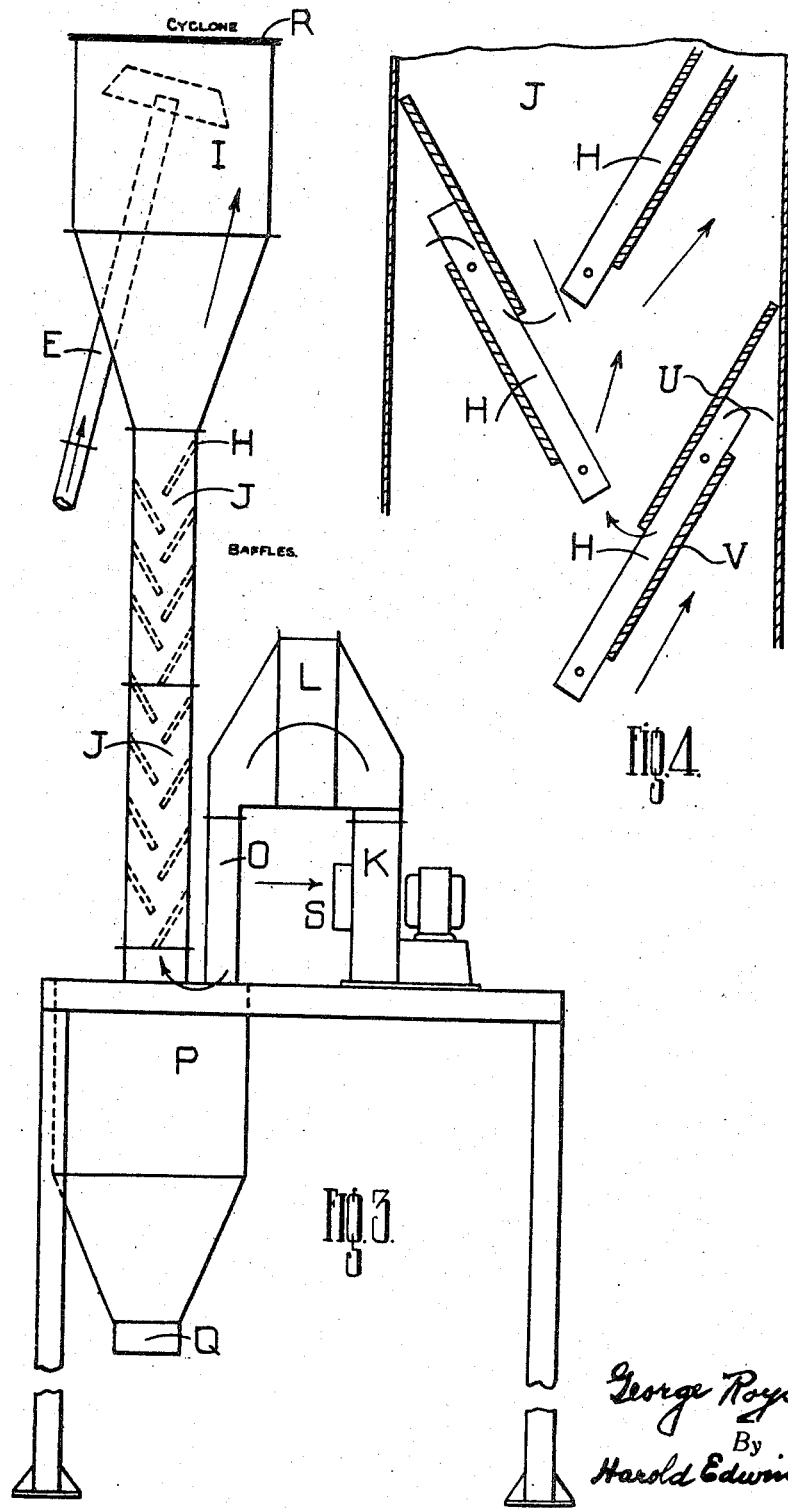

Patented June 29, 1948

2,444,406

UNITED STATES PATENT OFFICE 2,444,406

APPARATUS FOR DRYING AND CONDITIONING SULFATE OF AMMONIA AND OTHER GRANULAR AND CRYSTALLINE PRODUCTS

George Royston, Barnsley, England

Application July 6, 1945, Serial No. 603,512
In Great Britain August 12, 1944

2 Claims. (Cl. 34—57)

1

This invention concerns the drying of granular and crystalline material such as sulphate of ammonia.

One object of the invention is to provide a process of and apparatus for drying ammonium sulphate and the like granular and crystalline material.

This and other objects and advantages of the invention will become apparent from the following description with reference to the drawing annexed hereunto.

In the drawing—

Figure 1 is a diagrammatic side elevation of a first part of the apparatus;

Figure 2 is a detail plan view of part of the apparatus of Fig. 1;

Figure 3 is a diagrammatic side elevation of a further part of the apparatus; and Figure 4 is a detail in vertical section on an enlarged scale, of part of the apparatus of Fig. 3.

Referring to the drawings, sulphate of ammonia as received from the centrifuge or hydroextractor in a moist state is fed into hopper A (Figures 1 and 2). Rotating scrapers B driven by gears C to carry the sulphate to and over an air jet D and under delivery pipe E.

The sulphate is airborne and carried by a blast of conditioned air supplied through pipe F, through heater G by blower N. The airborne sulphate passes through pipe E into hopper and expansion chamber I where it is deposited and drops down tower J (Figure 3) over baffles H against an upward flow of conditioned air delivered by blower K through heater L. The air finally escapes through filter R to atmosphere. The sulphate falls into bunker P and is discharged into bags at Q.

The volume of air supplied to blower K is regulated by dampers placed on the inlet of the blower at S. Only one blower may be used, or one blower and heater, the air supply to one of the stages, preferably the second being branched off the other.

Alternatively one stage (the first) may be supplied with hot dry air and the other with cool dry air.

Arrows show the direction taken by the air.

The baffles are preferably constructed as double louvres (Figure 4). Each baffle consists of a pair of parallel plates U and V connected to their edges to the front and back of the tower, one plate being displaced sideways with regard to the other. The upper plates U are in contact with the side walls of the tower so that no gas can pass between their ends and the walls of the tower, and the whole baffle plate forms an open ended box shaped hollow double louvre.

The material, after passing up through pipe E into the expansion chamber I, is dried to the extent of about 70% of its original moisture being removed.

By the term "gas" is intended to be included air or other gases or mixtures of thereof; and by "conditioned" is intended to be included heated, cooled, dried, hot, cool and dry and appropriate combinations thereof.

I declare that what I claim is:

1. An apparatus for drying granular and crystalline material such as ammonium sulphate, comprising a hopper having at its bottom a substantially horizontal plate having an orifice therein, means for blowing a current of conditioned dehumidifying gas through said orifice, means for displacing wet material across the surface of the plate to bring said material into contact with the upwardly moving gas current, an expansion chamber, an uptake pipe disposed above the orifice in said plate and extending substantially vertically therefrom into said expansion chamber, a tower in communication with said expansion chamber, said tower having an upper and a lower end, a set of downwardly and inwardly sloping louvre plates connected to and disposed within the walls of said tower at spaced intervals throughout the height thereof, a second set of louvre plates each plate of said second set being disposed parallel with, laterally overlapping and spaced from a corresponding louvre plate in the first mentioned set of louvre plates and having the edge of each of said plates of said second set adjacent the wall of the tower spaced inwardly therefrom to allow passage of gas between said last mentioned edge and the wall of said tower, means for introducing material to be dried into the tower in the region of the upper end thereof and means for introducing a current of conditioned gas into the tower in the region of the lower end thereof, whereby material falling down the tower from louvre plate to louvre plate is exposed to a turbulently ascending gas current with improved drying effect.

2. An apparatus for drying granular and crystalline material such as ammonium sulphate, comprising a horizontal plate having a substantially circular orifice therein, a generally vertically extending uptake pipe having an upper end and a lower end, said lower end being disposed above and substantially coaxial with the orifice in said plate, and a rotary scraper mounted for rotation about an axis parallel with and laterally displaced from the axis of said orifice, and having an arm displaceable over the surface of said plate across said orifice and below the said lower end of the uptake pipe for displacing wet material across the surface of the plate to bring said material into contact with the upwardly moving current of gas, an expansion chamber into which the upper end of said uptake pipe extends, a vertically extending tower in communication with said expansion chamber, said tower having an upper end and a lower end, a set of downwardly and inwardly sloping louvre plates connected to and disposed within the walls of said tower at spaced intervals throughout the height thereof, a second set of louvre plates each plate of said second set being disposed parallel with, laterally overlapping and spaced from a corresponding louvre plate in the first mentioned set of louvre plates and having the edge of each of said plates of said second set adjacent the wall of the tower spaced inwardly therefrom to allow passage of gas between said last mentioned edge and the wall of said tower, means for introducing material to be dried into the tower in the region of the upper end thereof and means for introducing a current of conditioned gas into the tower in the region of the lower end thereof, whereby material falling down the tower from louvre plate to louvre plate is exposed to a turbulently ascending gas current with improved drying effect.

GEORGE ROYSTON.

REFERENCES CITED

The following references are of record in the file of this patent:

UNITED STATES PATENTS

| Number | Name | Date |
|---|---|---|
| 1,550,992 | Trump | Aug. 25, 1925 |
| 1,816,236 | Shuyler | July 28, 1931 |
| 1,913,470 | Andersen | June 13, 1933 |
| 1,945,918 | Schmidt | Feb. 6, 1934 |
| 2,117,822 | Pehrson et al. | May 17, 1938 |
| 2,118,078 | Flugel | May 24, 1938 |
| 2,293,728 | Freund | Aug. 25, 1942 |

FOREIGN PATENTS

| Number | Country | Date |
|---|---|---|
| 395,912 | Great Britain | July 27, 1933 |